Sept. 17, 1968  E. K. KARLSSON  3,401,700
COMBINE BEATER GRATE
Filed June 2, 1966

INVENTOR
ELOF K. KARLSSON

By F. David Au Buchon ATT'Y.

United States Patent Office 3,401,700
Patented Sept. 17, 1968

3,401,700
COMBINE BEATER GRATE
Elof K. Karlsson, East Moline, Ill., assignor to International Harvester Company, Chicago, Ill., a corporation of Delaware
Filed June 2, 1966, Ser. No. 554,791
6 Claims. (Cl. 130—27)

The present invention relates generally to improvements in combine beater grates and the like and more particularly to a new and improved combine beater grate made up of individual fingers having projections formed thereon.

It is the common construction in combine design to provide a beater directly behind the threshing cylinder having arms or teeth which move past the surface of the threshing cylinder closely thereto for stripping off any straw that tends to cling to the threshing cylinder and throw it rearwardly to the straw rack. The beater is usually made cylindrical in form having elongated paddles projecting therefrom for engaging the straw. Another function performed by the beater is to deflect kernels of grain that are thrown rearwardly by the threshing cylinder and prevent their being thrown under the rear end of the machine and to direct this grain to the forward end of the straw rack where it is separated from the straw.

It is also the common construction to provide a grate extending rearwardly from the rear end of the combine over which the threshed grain and straw is swept by the beater and through which grain falls to the separating shoe located below the grate. These grates have conventionally been constructed either as a lattice work or a plurality of individual rearwardly extending fingers. The lattice work grate has the disadvantage that there is an inherent characteristic to clog. The grate constructed of individual fingers has the disadvantage that it permits a large fallthrough capacity and does not exercise a retorting and threshing action on a crop as it passes over the grate.

The general purpose of this invention is to provide a grate which embraces all the advantages of similarly employed grates and possesses none of the aforedescribed disadvantages. To attain this, the present invention contemplates a grate constructed of individually rearwardly extending fingers having projections spaced longitudinally thereof that will cause a retorting and threshing action on the crop and yet provide a grill with a large fallthrough capacity.

An object of the present invention is the provision of a grill with a large fallthrough capacity that exercises a retorting and threshing action on the crop as it passes over the grill.

Another object is to provide a grate constructed of grate fingers having projections thereon that do not completely fill the space between adjacent fingers.

Figure 1:
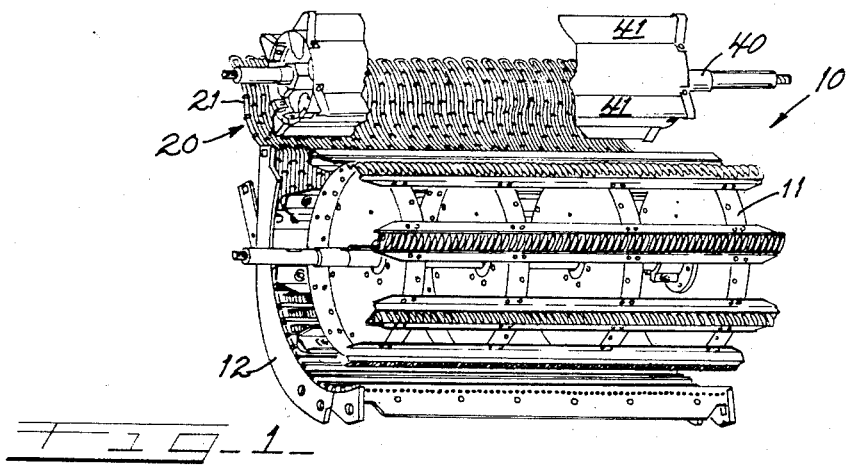
Figure 2:
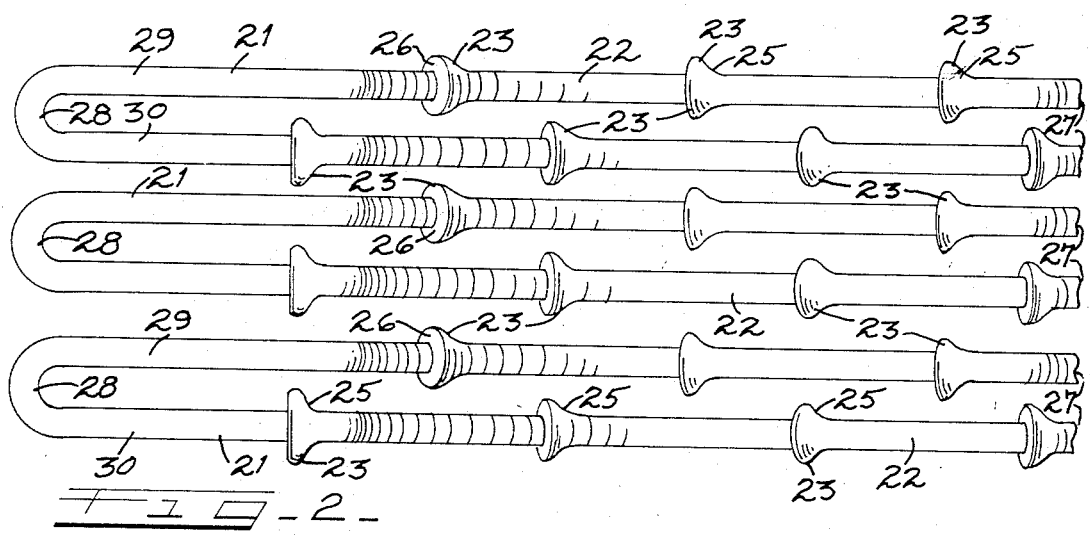
Figure 3:
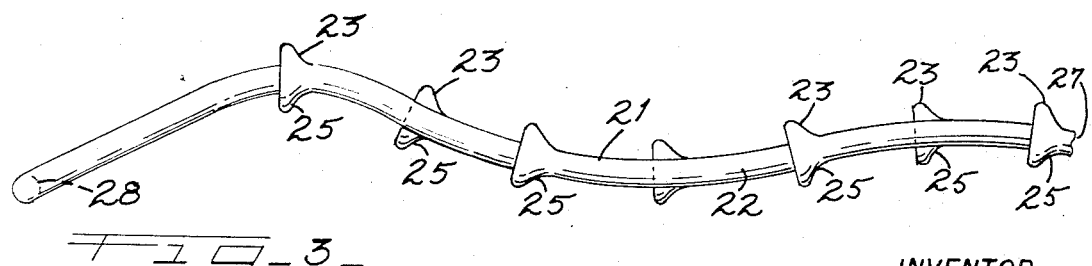

These and other objects of the invention will become more apparent from the specification and drawings wherein:

FIGURE 1 is a pictorial view of a threshing apparatus including a grate and beater, and FIGURE 2 is a plan view of one finger from which the grate is formed, and FIGURE 3 is a side view of one finger from which the grate is formed.

Referring now to the drawings wherein like reference characters designate like or corresponding parts throughout the several views, there is shown in FIGURE 1, a threshing apparatus generally designated 10 including a cylinder 11, a concave 12, a grate 20 and a beater 40. The cylinder concave and beater are all of conventional design and are important only insofar as they constitute the environment for the applicant's new and improved grate 20.

The grate 20 is made up of a plurality of fingers 21 that extend outwardly from the rear edge of the concave. Each of the fingers 21 is circular in cross-section and is formed from an elongated U-shaped rod 22 having an open end 27, a bite portion 28, a first leg 29, and a second leg 30. The rods 22 have a plurality of projections 23 spaced axially thereof. The projections 23 are circular in cross section and each is in the form of a disk radiating from the elongated rod having a filled radius 25 on one side of the disk. The other side of the disk is not filled and presents a flat surface designated 26. The projections 23 are arranged along the elongated rods 22 such that the radius 25 is on the side of the projection towards the concave 12. The material flows over the grate 20 in a direction away from the concave 12 and the projections are arranged such that the material can ride up the radiuses 25 and over the projections. The flat surfaces 26 of the projections will prevent a backflow of the material towards the concave. The projections thus function in a manner similar to a ratchet permitting material to move away from the concave but preventing it from moving towards the concave. The first and second legs 29 and 30, respectively, of each finger 21 are spaced from each other and the projections 23 are dimensioned such that they do not completely fill the space between the first and second legs. As can be best seen in FIGURE 2, the projections 23 on the first and second legs are interlaced with respect to each other. The fingers 21 making up the grate 20 are laterally spaced with respect to each other sufficiently so that projections 23 on adjacent fingers 21 do not completely fill the space between adjacent fingers.

As can be best seen in FIGURE 3, the fingers 21 are contoured such that they present a concave surface over which the beater 40 is located. The beater 40 is of conventional construction including a plurality of paddles or arms 41.

In operation, unthreshed material is fed to the threshing apparatus 10 and is processed between the cylinder 11 and concave 12. During this threshing operation, much of the grain passes through the concave 12. However, some threshed grain is thrown rearwardly when it encounters the beater 40. The beater deflects it downwardly towards the grate 20. The straw which still retains some grain, is also fed rearwardly of the concave towards the beater 40 and grate 20. The beater 40 functions to feed this material rearwardly over the grate 20 causing some additional threshing. The grate 20 must permit the grain that has been removed from the straw or stems to pass through and also it must present an irregular surface to cause threshing of the material. The shape of the projections will cause any straw or stems there moving across the upper surface of the grate to ride up from the grate surface and will thus discourage any of this material from passing through the grate. Since there is a space between each projection and the adjacent rods, the straw can flow past the projections although it extends partially through the grate and there is little likelihood of an accumulation of material around a projection.

What is claimed is:
1. In a threshing apparatus including a cylinder and a concave,
   a grate disposed behind said concave and comprising a row of laterally spaced fingers, said fingers supported at one end on said concave and extending rearwardly therefrom,
   said fingers including elongated rods, circular in cross section and having projections spaced longitudinally thereof, said projections being circular in cross section and shaped such that they taper gradually down to the size of the elongated rod on the side toward the concave and change abruptly to the size of the rod on the side away from the concave whereby material moving over said grate away from said concave will ride up and over the projections but will be prevented by the projections from moving over the grate in a direction toward the concave.

2. The invention as set forth in claim 1 whereby the elongated rods are U-shaped having their open ends supported on said concave.

3. The invention as set forth in claim 2 wherein the projections on each set of the U-shaped elongated rods interlace with the projections on the adjacent legs.

4. The invention as set forth in claim 1 wherein said fingers are spaced laterally sufficiently to provide a space between said projections and the adjacent fingers.

5. The invention as set forth in claim 2 wherein said fingers are spaced laterally from each other and the legs of each U-shaped rod are spaced laterally sufficiently to provide a space between the projections and the adjacent elongated rods.

6. The invention as set forth in claim 3 wherein said fingers are spaced laterally from each other and the legs of each U-shaped rod are spaced laterally sufficiently to provide a space between the projections and the adjacent elongated rods.

References Cited

UNITED STATES PATENTS 798,971   9/1905   Nofziger _____ 130—27.10

ANTONIO F. GUIDA, *Primary Examiner.*